(12) United States Patent
Tsuda et al.

(10) Patent No.: US 9,366,333 B2
(45) Date of Patent: Jun. 14, 2016

(54) VEHICLE DIFFERENTIAL GEAR

(71) Applicant: JTEKT CORPORATION, Osaka (JP)

(72) Inventors: Takuya Tsuda, Tokorozawa (JP);
Akinao Minegishi, Isesaki (JP); Kenji Kushizaki, Tokorozawa (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/682,535

(22) Filed: Apr. 9, 2015

(65) Prior Publication Data
US 2015/0300482 A1 Oct. 22, 2015

(30) Foreign Application Priority Data

Apr. 16, 2014 (JP) .................. 2014-084673

(51) Int. Cl.
| | |
|---|---|
| *F16H 48/06* | (2006.01) |
| *F16H 57/04* | (2010.01) |
| *F16H 48/11* | (2012.01) |
| *F16H 48/285* | (2012.01) |
| *F16H 48/10* | (2012.01) |
| *F16H 48/38* | (2012.01) |

(52) U.S. Cl.
CPC ............ *F16H 57/0483* (2013.01); *F16H 48/06* (2013.01); *F16H 48/11* (2013.01); *F16H 48/285* (2013.01); *F16H 48/38* (2013.01); *F16H 57/041* (2013.01); *F16H 2048/106* (2013.01); *F16H 2048/387* (2013.01)

(58) Field of Classification Search
CPC ... F16H 57/0483; F16H 48/38; F16H 57/041; F16H 48/06
See application file for complete search history.

(56) References Cited

U.S. PATENT DOCUMENTS

| | | | |
|---|---|---|---|
| 3,637,497 A * | 1/1972 | Simmons ...................... 508/117 |
| 5,194,054 A | 3/1993 | Amborn et al. |
| 5,342,256 A | 8/1994 | Amborn et al. |
| 6,123,009 A * | 9/2000 | Kanayama et al. ............... 92/71 |
| 8,961,349 B2 * | 2/2015 | Kellogg ........................ 475/184 |
| 2005/0082139 A1* | 4/2005 | Ishikawa et al. ......... 192/107 M |
| 2006/0263604 A1* | 11/2006 | Martin et al. ................. 428/408 |
| 2008/0051244 A1* | 2/2008 | Nakajima et al. ............. 475/230 |
| 2009/0186739 A1 | 7/2009 | Fujii et al. |
| 2009/0283353 A1* | 11/2009 | Kitahata et al. .............. 180/443 |
| 2010/0081535 A1* | 4/2010 | Gutsmiedl .................... 475/228 |
| 2010/0236859 A1* | 9/2010 | Kitahata et al. ............... 180/443 |

FOREIGN PATENT DOCUMENTS

| | | |
|---|---|---|
| JP | 8-219261 A | 8/1996 |
| JP | 2002-81524 A | 3/2002 |
| JP | 2009-174577 A | 8/2009 |

OTHER PUBLICATIONS

Extended European Search Report issued Oct. 5, 2015 in Patent Application No. 15163475.5.

* cited by examiner

*Primary Examiner* — David J Hlavka
(74) *Attorney, Agent, or Firm* — Oblon, McClelland, Maier & Neustadt, L.L.P.

(57) ABSTRACT

A vehicle differential gear includes first and second pinion gears rotatably supported by a differential case; first and second side gears meshing with the first and second pinion gears and each coupled to corresponding one of a pair of output shafts; and a center washer, a first end washer and a second end washer each having a sliding surface that slides with an axial end face of at least one side gear of the first or second side gears, the sliding surface being lubricated by a lubricating oil; wherein a surface treatment for enhancing a solid lubricating property is performed on the washers.

5 Claims, 4 Drawing Sheets

VEHICLE DIFFERENTIAL GEAR

INCORPORATION BY REFERENCE

The disclosure of Japanese Patent Application No. 2014-084673 filed on Apr. 16, 2014 including the specification, drawings and abstract, is incorporated herein by reference in its entirety.

BACKGROUND OF THE INVENTION

1. Field of the Invention

The invention relates to a vehicle differential gear that distributes a driving force of a drive source of a vehicle to a pair of output shafts while allowing a differential operation.

2. Description of Related Art

Conventionally, a vehicle differential gear that distributes a driving force of a drive source of a vehicle to a pair of output shafts while allowing a differential operation is, for example, arranged between right and left wheels of the vehicle. As such a vehicle differential gear, a vehicle differential gear is known, in which the differential between the output shafts is limited so that even if slip occurs at a wheel to which the driving force is transmitted by one output shaft, e.g., a left wheel, the driving force can be transmitted to a wheel to which the driving force is transmitted by the other output shaft, e.g., a right wheel, so that a travelling stability during travelling on a low $\mu$ road and the like is enhanced. See for example, Japanese Patent Application Publication No. 2009-174577 (JP 2009-174577 A).

The vehicle differential gear (differential gear mechanism) described in JP 2009-174577 A includes a differential case (housing), to which a driving force of an engine is input, a plurality of pairs of pinion gears (planet gears) rotatably supported by the differential case, a pair of side gears (sun gears) that mesh with the plurality of pairs of pinion gears, a center washer arranged between opposing surfaces of the pair of side gears, and an end washer arranged between each of the pair of side gears and the differential case. A lubricating oil is introduced into the housing, so that the sliding of each unit is lubricated by the lubricating oil.

The pinion gear and the side gear are helical gears having helical teeth, where a thrust force in an axial direction generates between the respective gears due to meshing of the pinion gear and the side gear. This thrust force causes the pair of side gears to be pushed against the center washer or the end washer thus generating a frictional force, and such frictional force limits the differential between the pair of side gears.

With an increase in environmental awareness in recent years, further enhancement in fuel efficiency performance of the vehicle is desired, and downsizing and weight reduction are also demanded on the vehicle differential gear. However, if the pinion gear, the side gear, and the washers (center washer and end washer) forming the vehicle differential gear are simply downsized, an area of the sliding surfaces of the side gear and the washer decreases, thus increasing a surface pressure due to the thrust force. When the side gear is rotated at a high speed with respect to the washer in a high surface pressure state, the possibility that an oil film shortage locally occurs becomes higher. If the oil film shortage occurs in such manner, a friction coefficient at the sliding surface increases and the frictional force becomes unstable, whereby vibration may occur during the relative rotation of the pair of side gears.

SUMMARY OF THE INVENTION

It is an object of the present invention to provide a vehicle differential gear that inhibits a frictional force between a side gear and a washer from becoming unstable and that achieves downsizing and weight reduction.

An aspect of the present invention relates to a vehicle differential gear that distributes a driving force of a drive source of a vehicle to a pair of output shafts while allowing a differential operation. The vehicle differential gear includes: a differential case, to which the driving force is input; a plurality of pinion gears rotatably supported by the differential case; a pair of side gears meshing with the plurality of pinion gears and each coupled to a corresponding one of the pair of output shafts; and a washer having a sliding surface that slides with an axial end face of at least one side gear of the pair of side gears, the sliding at the sliding surface being lubricated by a lubricating oil. The pair of side gears and the plurality of pinion gears are helical gears that generate a thrust force in an axial direction by meshing; and the washer is subjected to a surface treatment for enhancing a solid lubricating property at the sliding surface.

According to the vehicle differential gear of the above aspect, it is possible to inhibit the frictional force between the side gear and the washer from becoming unstable, thereby achieving downsizing and weight reduction of the vehicle differential gear.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
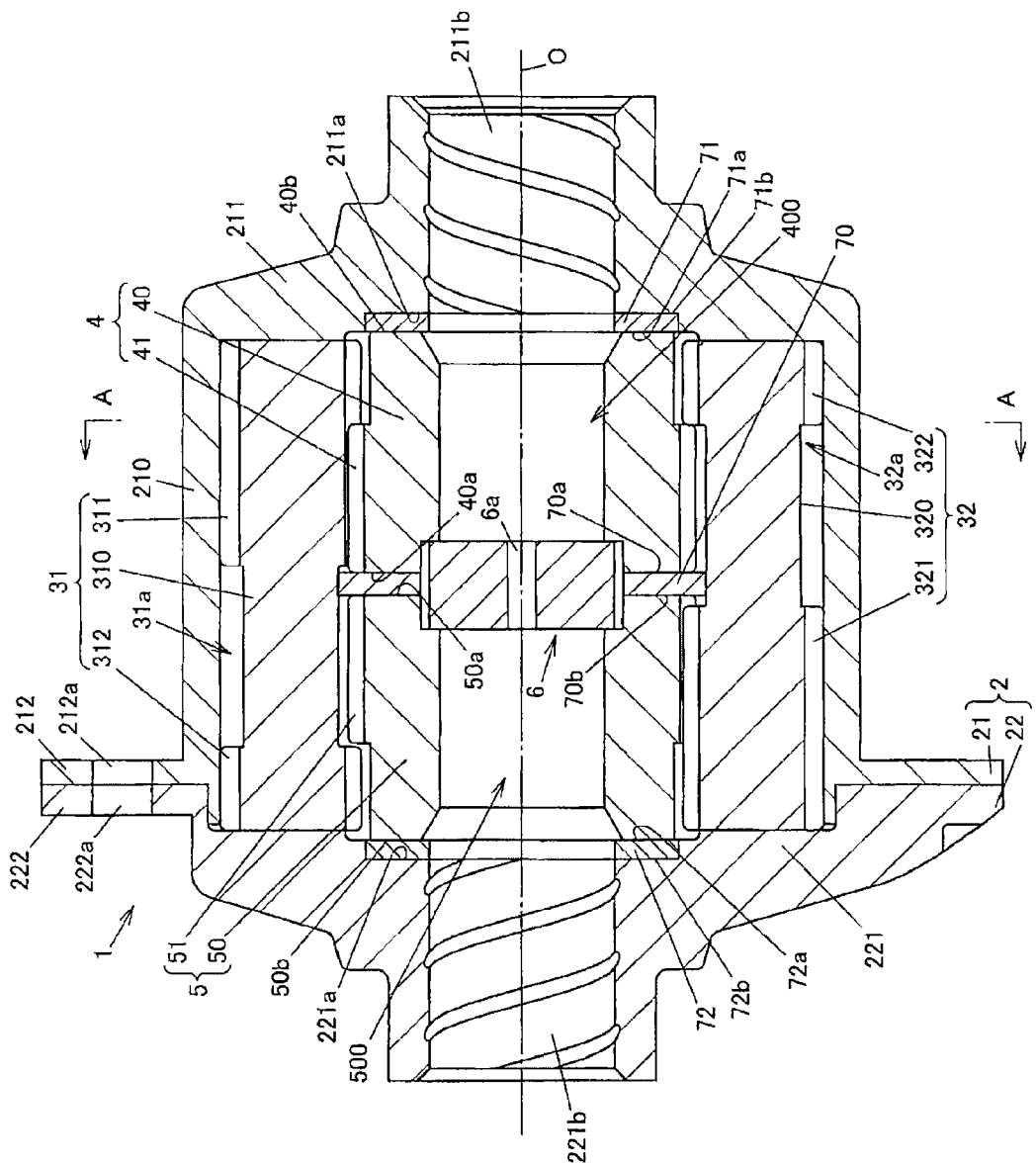
FIG. 1 is a cross-sectional view showing a configuration example of a vehicle differential gear according to an embodiment of the present invention.

Hereinafter, a configuration of a vehicle differential gear according to an embodiment of the present invention will be described with reference to FIGS. 1 to 3.

A vehicle differential gear 1 is used to distribute a driving force of a drive source of a vehicle to a pair of output shafts while allowing a differential operation. Examples of the drive source include an engine and an electrical motor. The vehicle differential gear 1 according to the present embodiment is used as a differential gear that distributes the driving force of the drive source transmitted through a propeller shaft, for example, to right and left rear wheels, and distributes the input driving force to a pair of right and left axle shafts serving as the pair of output shafts.

The vehicle differential gear 1 includes: a differential case 2, to which the driving force is input; a first pinion gear 31 and a second pinion gear 32 rotatably supported by the differential case 2; a first side gear 4 and a second side gear 5 that mesh with the first pinion gear 31 and the second pinion gear 32 and that are each coupled to the corresponding one of the pair of axle shafts; an axle spacer 6 arranged between the first side gear 4 and the second side gear 5; and a center washer 70, a first end washer 71 and a second end washer 72 that slide with an axial end face of at least one of the first side gear 4 and the second side gear 5.

The differential case 2, the first side gear 4, and the second side gear 5 have a common rotation axis line O and are relatively rotatable about the rotation axis line O. The rotation axes of the first pinion gear 31 and the second pinion gear 32 are parallel to the rotation axis line O. Hereinafter, a direction parallel to the rotation axis line O is referred to as "axial direction".

The differential case 2 includes a main body unit 21 having a bottomed cylindrical shape in which one side in the axial direction is opened, and a lid unit 22 arranged to close the opening of the main body unit 21. The main body unit 21 and the lid unit 22 are coupled by a bolt (not shown) to integrally rotate.

The main body unit 21 integrally includes a cylindrical portion 210 having a cylindrical shape, a bottom portion 211 formed to close an end on one side of the cylindrical portion 210 in its axial direction, and a flange portion 212 formed to project radially outward at an end on the opposite side of the cylindrical portion 210 from the bottom portion 211 in the axial direction. The lid unit 22 integrally includes a disc portion 221 having a disc shape that axially faces the bottom portion 211 of the main body unit 21, and a flange portion 222 formed to project radially outward from an outer circumferential surface of the disc portion 221.

The flange portion 212 of the main body unit 21 is provided with a plurality of (ten in the present embodiment) bolt inserting holes 212a, and the flange portion 222 of the lid unit 22 is also provided with the same number of bolt inserting holes 222a. The flange portions 212, 222 of the main body unit 21 and the lid unit 22 are abutted against each other so that the bolt inserting holes 212a, 222a communicate. A bolt that couples the main body unit 21 and the lid unit 22 is inserted through the bolt inserting holes 212a, 222a and screw-fitted into a ring gear (not shown), so that the driving force of the drive source is input to the differential case 2 through the ring gear.

The first pinion gear 31 and the second pinion gear 32 mesh with each other to form a pair, and are rotatably supported by the differential case 2. In the present embodiment, four pairs of first pinion gear 31 and second pinion gear 32 are supported by the differential case 2, as shown in FIGS. 2 and 3.

The first pinion gear 31 integrally includes a shaft portion 310 having a circular column shape, a first gear portion 311 arranged at one end of the shaft portion 310 (end on the bottom portion 211 side in the main body unit 21 of the differential case 2), and a second gear portion 312 arranged at the other end of the shaft portion 310 (end on the lid unit 22 side of the differential case 2). A neck portion 31a having a smaller diameter than a root circle of the gear portions 311, 312 is formed between the first gear portion 311 and the second gear portion 312.

The second pinion gear 32 has a shape symmetrical with the first pinion gear 31. In other words, the second pinion gear 32 integrally includes a shaft portion 320 having a circular column shape, a first gear portion 321 arranged at one end of the shaft portion 320 (end on the lid unit 22 side of the differential case 2), and a second gear portion 322 arranged at the other end of the shaft portion 320 (end on the bottom portion 211 side in the main body unit 21 of the differential case 2). A neck portion 32a having a smaller diameter than a root circle of the gear portions 321, 322 is formed between the first gear portion 321 and the second gear portion 322.

The first pinion gear 31 is formed such that the first gear portion 311 has a longer axial length than the second gear portion 312. Similarly, the second pinion gear 32 is formed such that the first gear portion 321 has a longer axial length than the second gear portion 322. The first gear portion 311 of the first pinion gear 31 meshes with the second gear portion 322 of the second pinion gear 32, and the second gear portion 312 of the first pinion gear 31 meshes with the first gear portion 321 of the second pinion gear 32.

Figure 2:
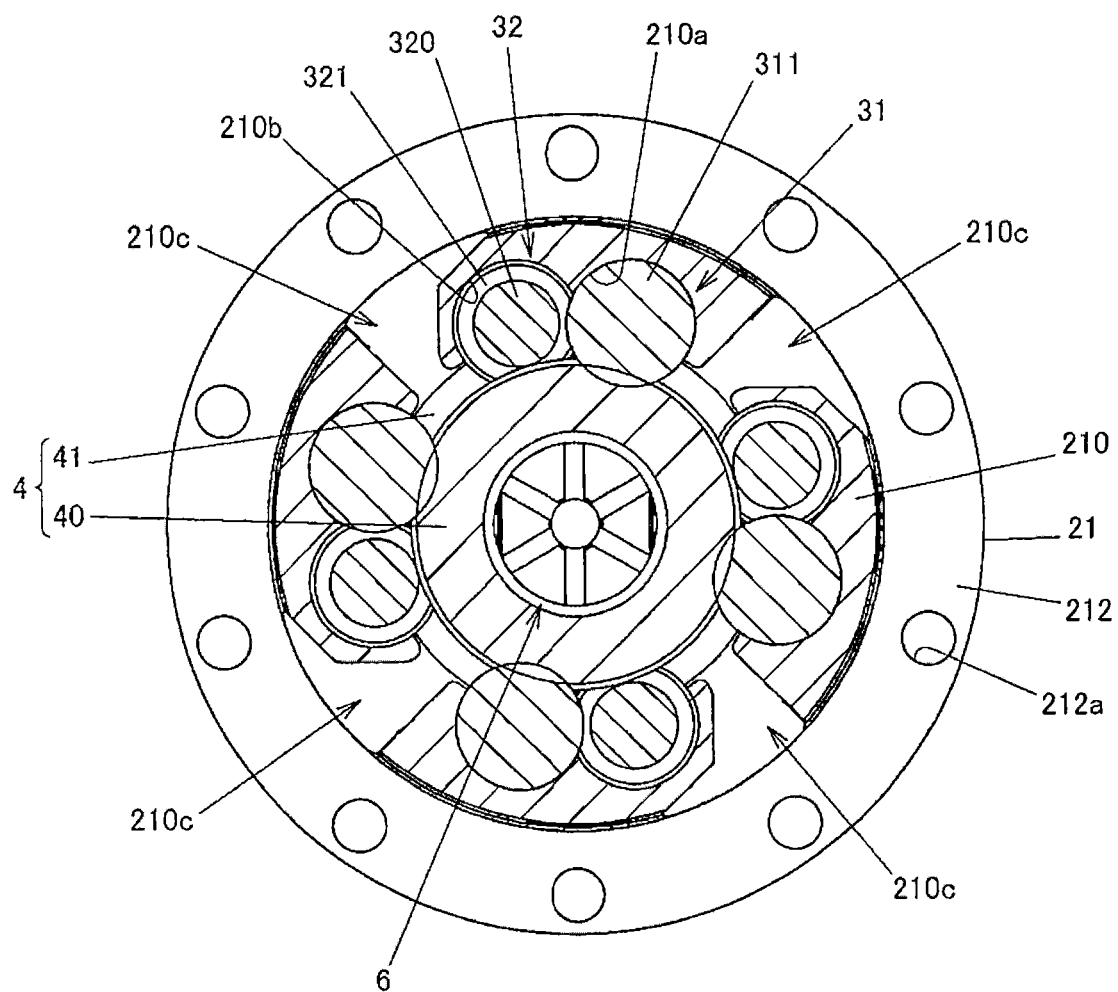
FIG. 2 is a cross-sectional view taken along line A-A of FIG. 1.
Figure 3:
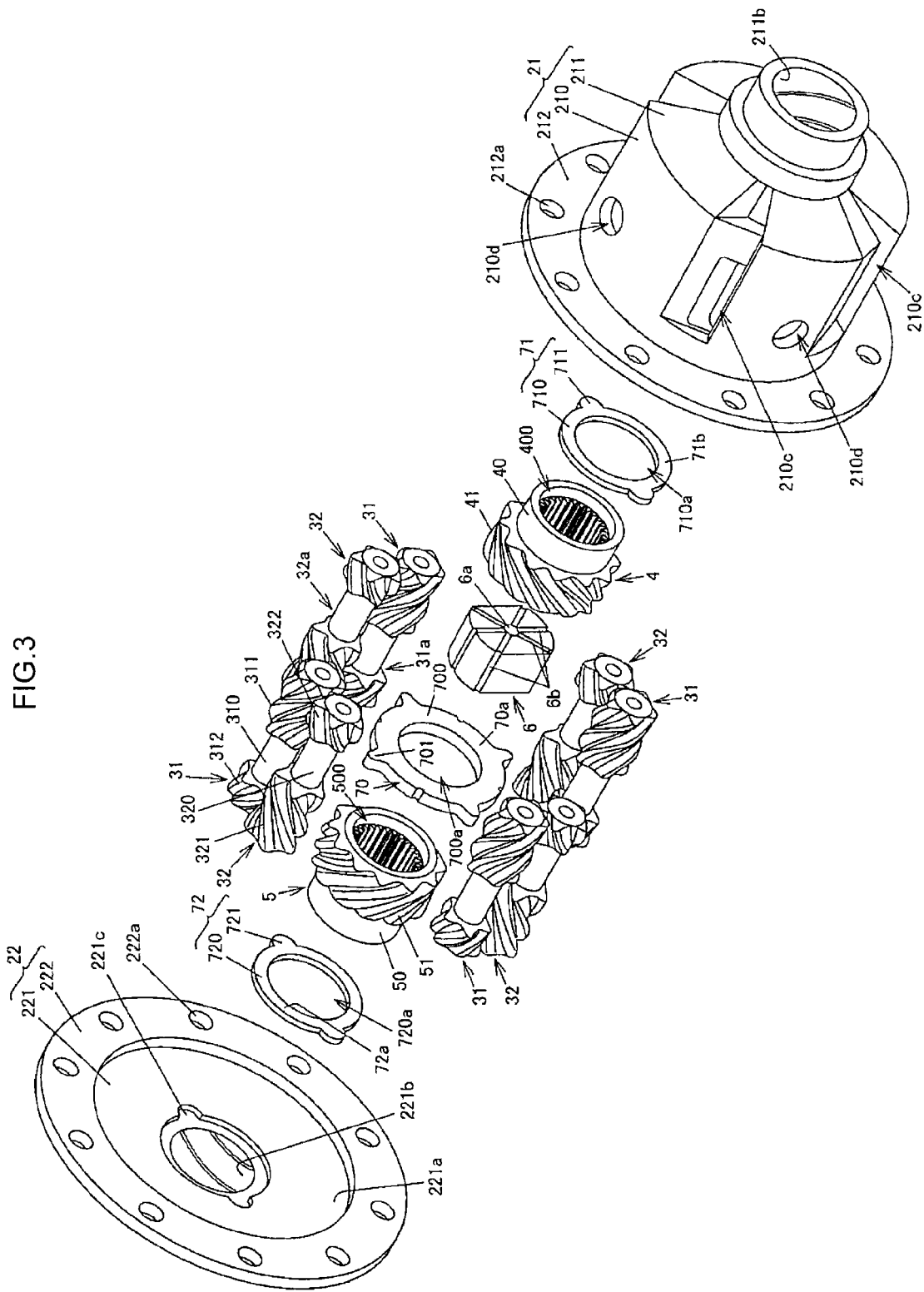
FIG. 3 is an exploded perspective view of the vehicle differential gear.

As shown in FIG. 2, the first pinion gear 31 is accommodated in a first accommodating section 210a formed in the cylindrical portion 210 in the main body unit 21 of the differential case 2. The second pinion gear 32 is similarly accommodated in a second accommodating section 210b formed in the cylindrical portion 210 in the main body unit 21 of the differential case 2. The first accommodating section 210a and the second accommodating section 210b are partially communicated, where the first gear portion 311 of the first pinion gear 31 and the second gear portion 322 of the second pinion gear 32 mesh with each other and the second gear portion 312 of the first pinion gear 31 and the first gear portion 321 of the second pinion gear 32 mesh with each other at the communicated portion.

At the cylindrical portion 210 in the main body unit 21 of the differential case 2, a lubricating oil introducing groove 210c that introduces the lubricating oil to the interior of the differential case 2 and a lubricating oil discharging hole 210d that discharges the lubricating oil from the differential case 2 are respectively formed at four areas. The lubricating oil introducing groove 210c is formed to introduce the lubricating oil to the interior of the differential case 2 at the time of forward travelling of the vehicle, where the lubricating oil introduced from the lubricating oil introducing groove 210c is discharged from the lubricating oil discharging hole 210d after lubricating each unit in the differential case 2. The lubricating oil is a gear oil having viscosity suited for lubricating the gear, for example, and is sealed in a differential carrier that rotatably supports the vehicle differential gear 1.

The first side gear 4 and the second side gear 5 are arranged in parallel in the axial direction in the differential case 2, and are supported in a relatively rotatable manner. An axle shaft of a right rear wheel of the vehicle, for example, is coupled to the first side gear 4, and an axle shaft of a left rear wheel of the vehicle, for example, is coupled to the second side gear 5. A shaft inserting hole 211b, to which the axle shaft coupled to the first side gear 4 is inserted, is formed at the bottom portion 211 in the main body unit 21 of the differential case 2, and a shaft inserting hole 221b, to which the axle shaft coupled to the second side gear 5 is inserted, is formed at the disc portion 221 of the lid unit 22.

The first side gear 4 integrally includes a cylindrical main body unit 40 having, at a center portion thereof, a spline-engagement part 400, with which the axle shaft is engaged in a relatively non-rotatable manner, and a gear portion 41 formed at one part of the outer circumferential surface of the main body unit 40. The second side gear 5 integrally includes a cylindrical main body unit 50 having, at a center portion thereof, a spline-engagement part 500, with which the axle shaft is engaged in a relatively non-rotatable manner, and a gear portion 51 formed at one part of the outer circumferential surface of the main body unit 50.

An axle spacer 6 and a center washer 70, to which the axle shafts are abutted from both sides in the axial direction, are arranged between the first side gear 4 and the second side gear 5. The axle spacer 6 is provided with a through hole 6a that passes through the center portion in the axial direction, and is also provided with a plurality of lubrication grooves 6b extending at an axial end face and an outer circumferential surface of the axle spacer 6 with the through hole 6a as a center. The axle spacer 6 is accommodated in a recessed portion formed in each of the first side gear 4 and the second side gear 5.

The center washer 70 is arranged between an axial end face 40a in the main body unit 40 of the first side gear 4 and an axial end face 50a in the main body unit 50 of the second side gear 5. As shown in FIG. 3, the center washer 70 is provided with four projecting portions 701 each projecting toward a portion between the neck portion 31a of the first pinion gear 31 and the neck portion 32a of the second pinion gear 32 from an outer circumferential surface of an annular circular plate portion 700. A circular hole 700a passing through the center washer 70 in the axial direction (thickness direction) is formed at the center portion of the circular plate portion 700, and the axle spacer 6 is arranged inside the circular hole 700a.

The first end washer 71 is arranged between an axial end face 40b that is on the opposite side of the main body unit 40 of the first side gear 4 from the center washer 70 and an inner surface 211a of the bottom portion 211 in the main body unit 21 of the differential case 2. As shown in FIG. 3, the first end washer 71 is provided with two projecting portion 711 projecting radially outward from an outer circumferential surface of an annular circular plate portion 710. A circular hole 710a, to which the axle shaft is inserted, is formed to pass through the first end washer 71 in the axial direction (thickness direction) at the center portion of the circular plate portion 710.

A second end washer 72 is arranged between an axial end face 50b that is on the opposite side of the main body unit 50 of the second side gear 5 from the center washer 70 and an inner surface 221a of the disc portion 221 in the lid unit 22 of the differential case 2. As shown in FIG. 3, the second end washer 72 is provided with two projecting portions 721 projecting radially outward from the outer circumferential surface of an annular circular plate portion 720. A circular hole 720a, to which the axle shaft is inserted, is formed to pass through the second end washer 72 in the axial direction (thickness direction) at the center portion of the circular plate portion 720.

Two recesses 221c, to which the two protruding portions 721 of the second end washer 72 are respectively fitted, are formed on the disc portion 221 in the lid unit 22 of the differential case 2. The second end washer 72 is also prevented from rotating with respect to the differential case 2 by fitting the protruding portions 721 to the recesses 221c. Although the illustration is omitted, the first end washer 71 is also prevented from rotating with respect to the differential case 2 with a similar configuration.

As shown in FIG. 1, the gear portion 41 of the first side gear 4 is formed at a portion of the outer circumferential surface of the main body unit 40 on the center washer 70 side. Similarly, the gear portion 51 of the second side gear 5 is formed at a portion of the outer circumferential surface of the main body unit 50 on the center washer 70 side. The first gear portion 311 of the first pinion gear 31 meshes with the gear portion 41 of the first side gear 4 and the first gear portion 321 of the second pinion gear 32 meshes with the gear portion 51 of the second side gear 5.

The second gear portion 322 of the second pinion gear 32 is arranged at such a position as not to radially face the gear portion 41 on the outer circumferential side of the main body unit 40 of the first side gear 4, and thus does not mesh with the first side gear 4. The second gear portion 312 of the first pinion gear 31 is arranged at such a position as not to radially face the gear portion 51 on the outer circumferential side of the main body unit 50 of the second side gear 5, and thus does not mesh with the second side gear 5.

The first pinion gear 31, the second pinion gear 32, the first side gear 4 and the second side gear 5 are helical gears that generate a thrust force in the axial direction by meshing. In other words, the first gear portion 311 and the second gear portion 312 of the first pinion gear 31 and the first gear portion 321 and the second gear portion 322 of the second pinion gear 32 are formed of helical teeth, and the gear portion 41 of the first side gear 4 and the gear portion 51 of the second side gear 5 are also formed of helical teeth having a helix angle adapted to each gear portion of the first pinion gear 31 and the second pinion gear 32.

Thus, when the driving force of the drive source is input to the differential case 2 and the driving force is transmitted from the differential case 2 to the first side gear 4 and the second side gear 5 through the first pinion gear 31 and the second pinion gear 32, the thrust force in the axial direction acts on the first side gear 4 and the second side gear 5. In the present embodiment, the helix angle of each gear portion is set so that the thrust forces in such directions that the first side gear 4 and the second side gear 5 approach each other act on the first side gear 4 and the second side gear 5 at the time of acceleration or steady travelling in a constant speed during the forward travelling of the vehicle, and for example, the thrust forces in such directions that the first side gear 4 and the second side gear 5 separate from each other act on the first side gear 4 and the second side gear 5 at the time of deceleration by an engine brake. However, the setting of the helix angle is not limited to this. The helix angle of each gear portion may be set so that the first side gear 4 and the second side gear 5 are subjected to the thrust forces in such directions that the first side gear 4 and the second side gear 5 separate from each other at the time of acceleration or steady travelling during the forward travelling of the vehicle.

In the center washer 70, a surface facing the axial end face 40a of the first side gear 4 is formed as a first sliding surface 70a, and a surface facing the axial end face 50a of the second side gear 5 is formed as a second sliding surface 70b. When the first side gear 4 and the second side gear 5 are relatively rotated with the thrust forces acting on the first side gear 4 and the second side gear 5 in such directions that the first side gear 4 and the second side gear 5 approach each other, the first sliding surface 70a of the center washer 70 slides with the axial end face 40a of the first side gear 4 and the second sliding surface 70b of the center washer 70 slides with the axial end face 50a of the second side gear 5.

In the first end washer 71, a surface facing the axial end face 40b of the first side gear 4 is formed as a sliding surface 71a, and a surface 71b on the opposite side from the sliding surface 71a contacts the inner surface 211a of the bottom portion 211 in the main body unit 21 of the differential case 2. In the second end washer 72, a surface facing the axial end face 50b of the second side gear 5 is formed as a sliding surface 72a, and a surface 72b on the opposite side from the sliding surface 72a contacts the inner surface 221a of the disc portion 221 in the lid unit 22 of the differential case 2.

When the thrust forces act on the first side gear 4 and the second side gear 5 in such directions that the first side gear 4 and the second side gear 5 separate from each other, the sliding surface 71a of the first end washer 71 slides with the axial end face 40b of the first side gear 4 and the sliding surface 72a of the second end washer 72 slides with the axial end face 50b of the second side gear 5.

The first sliding surface 70a of the center washer 70 slides with the axial end face 40a of the first side gear 4 and the second sliding surface 70b of the center washer 70 slides with the axial end face 50a of the second side gear 5 so that a frictional resistance force is generated between the first and second sliding surfaces 70a, 70b of the center washer 70 and the axial end faces 40a, 50a of the first side gear 4 and the second side gear 5. This frictional resistance force serves as a differential limiting force that limits the differential of the first side gear 4 and the second side gear 5.

When the thrust forces in the direction of separating from each other act on the first side gear 4 and the second side gear 5, the sliding surface 71a of the first end washer 71 slides with the axial end face 40b of the first side gear 4 and the sliding surface 72a of the second end washer 72 slides with the axial end face 50b of the second side gear 5. Thus, the frictional resistance force is generated between the sliding surfaces 71a, 71b of the first end washer 71 and the second end washer 72 and the axial end faces 40b, 50b of the first side gear 4 and the second side gear 5. This frictional resistance force serves as a differential limiting force that limits the differential of the first side gear 4 and the second side gear 5.

The differential limiting force that limits the differential of the first side gear 4 and the second side gear 5 is also generated by the frictional sliding of the outside surfaces of the first gear portion 311 and the second gear portion 312 of the first pinion gear 31 and the inner surface of the first accommodating section 210a in the main body unit 21 of the differential case 2, and the frictional sliding of the outside surfaces of the first gear portion 321 and the second gear portion 322 of the second pinion gear 32 and the inner surface of the second accommodating section 210b in the main body unit 21 of the differential case 2.

The sliding at the first and second sliding surfaces 70a, 70b of the center washer 70 and the sliding surfaces 71a, 72a of the first end washer 71 and the second end washer 72 is lubricated by the lubricating oil introduced into the differential case 2. The lubricating oil has a function of suppressing the abrasion and releasing the heat generated due to the friction.

In the center washer 70, the first end washer 71 and the second end washer 72, surface treatment for enhancing the solid lubricating property is performed on the surface of the plate-shaped base material made of iron-based metal such as cold rolled steel plate, and the like, for example. In the present embodiment, the surface treatment is Defric coating (registered trademark) of coating the lubricant containing molybdenum disulfide and graphite. That is, the first and second sliding surfaces 70a, 70b of the center washer 70 and the sliding surfaces 71a, 72a of the first end washer 71 and the second end washer 72 are covered with the lubricant containing molybdenum disulfide and graphite. In the present embodiment, nitriding treatment for generating a porous layer is performed on the surface of the base material to prevent peeling of the lubricant.

With such surface treatment, the center washer 70, the first end washer 71 and the second end washer 72 each have a friction coefficient on its surface, which is lower than that on the surface of the base material. Furthermore, the Vickers hardness of the first and second sliding surfaces 70a, 70b of the center washer 70 and the sliding surfaces 71a, 72a of the first end washer 71 and the second end washer 72 is lower than the Vickers hardness of the axial end faces 40a, 40b of the first side gear 4 and the axial end faces 50a, 50b of the second side gear 5.

More specifically, assuming the Vickers hardness of the first and second sliding surfaces 70a, 70b of the center washer 70 and the sliding surfaces 71a, 72a of the first end washer 71 and the second end washer 72 is V1 (Hv), and the Vickers hardness of the axial end faces 40a, 40b of the first side gear 4 and the axial end faces 50a, 50b of the second side gear 5 is V2 (Hv), V1 is smaller than or equal to 600 and V2 is 900 to 1500, for example. In other words, V1 is smaller than or equal to two thirds of V2. The desirable range of V1 is 400 to 600.

The result of conducting the sliding test using a center washer according to an example in which the Defric coating is provided on the surface of the base material as described above and a center washer according to a comparative example in which the Defric coating is not provided on the surface of the base material will be described with reference to FIG. 4.

Figure 4:
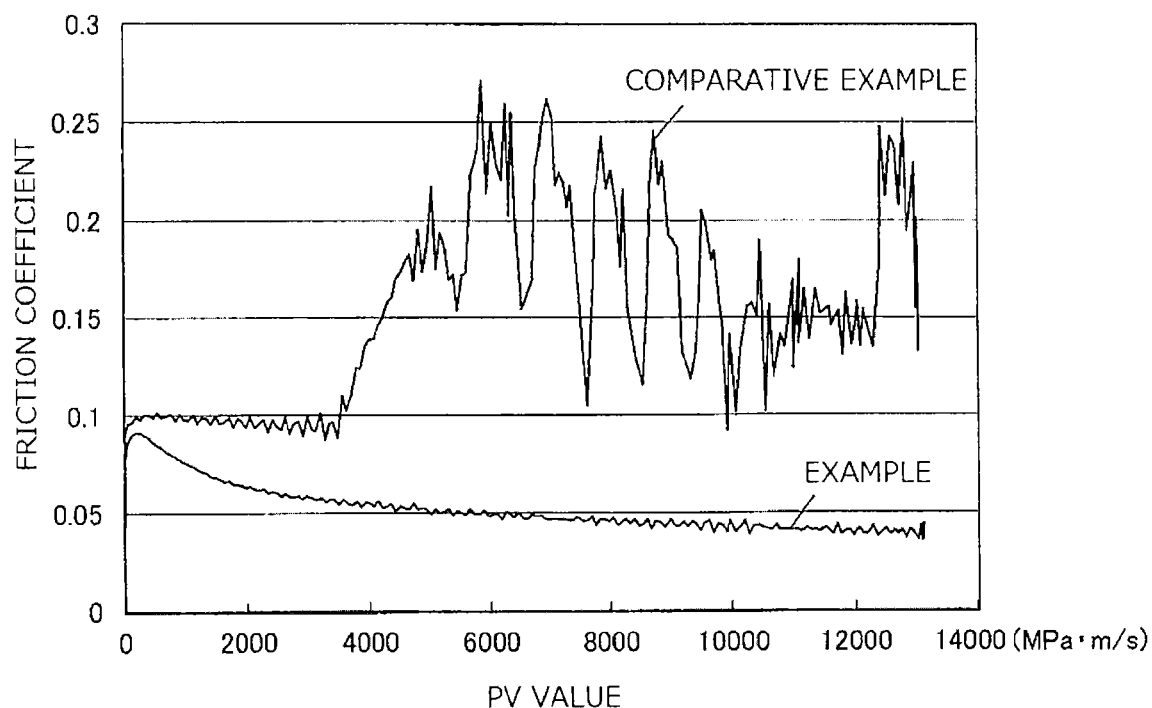
FIG. 4 is a graph showing a result of a sliding test according to an example and a comparative example.

FIG. 4 is a graph showing the result of the sliding test in which the center washers according to the example and the comparative example, and the friction material having a surface property same as the axial end faces 40a, 50a of the first side gear 4 and the second side gear 5 were sled while applying load in the lubricating oil. In such graph, the PV value (MPa·m/s) is shown on the horizontal axis and the friction coefficient is shown on the vertical axis. The PV value is a value obtained by multiplying a surface pressure (MPa) that each of the center washers according to the example and the comparative example receives from the friction material by a sliding speed (m/s) of the center washer and the friction material. The friction coefficient is a value obtained by dividing the frictional force generated between each of the center washers according to the example and the comparative example and the friction material by the load. This test was conducted by measuring the frictional force generated between the center washer and the friction material while increasing the PV value at a constant rate with the initial temperature of the lubricating oil at 40° C.

As shown in FIG. 4, when the center washer according to the example, on which the Defric coating was provided, was used, the friction coefficient when the PV value was about 200 was about 0.09, and with such value as the peak, the friction coefficient gradually lowered as the PV value became higher. The reason why the friction coefficient lowered may be that the temperature of the lubricating oil rose with the progress of the test, and the viscosity of the lubricating oil lowered and the activity of the additive contained in the lubricating oil enhanced with the temperature rise. Furthermore, the reason why the friction coefficient remained stable even when the PV value became high is considered that the Defric coating was provided on the surface of the center washer, thereby suppressing the wide fluctuation in the frictional force even if the oil film shortage locally occurred.

When the center washer according to the comparative example, on which the Defric coating was not provide, was used, the friction coefficient widely fluctuated when the PV value was larger than or equal to about 3500. This shows that when the PV value becomes larger than or equal to about 3500, the frictional force at the portion where the oil film shortage of the lubricating oil occurred rapidly rises and the friction coefficient becomes unstable as a whole. If such phenomenon occurs with the differential gear mounted on the vehicle, vibration occurs and the stable differential limiting force is not obtained.

The above is not limited to the case of the center washer, and similar effects can be expected when the Defric coating is provided on the end washer (first end washer 71 and second end washer 72).

The embodiment of the present invention described above provides the following operations and advantageous effects.

(1) Since the surface treatment for enhancing the solid lubricating property is performed on the first and second sliding surfaces 70a, 70b of the center washer 70 and the sliding surfaces 71a, 72a of the first end washer 71 and the second end washer 72, the wide fluctuation in the frictional force (differential limiting force) is suppressed even if the first side gear 4 and the second side gear 5 are relatively rotated while the center washer 70 or the first end washer 71 and the second end washer 72 is receiving a great load from the first side gear 4 and the second side gear 5. Thus, the first side gear 4 and the second side gear 5, and the center washer 70, the first end washer 71 and the second end washer 72 are downsized, thus contributing to the downsizing of the vehicle differential gear 1 and the reduction in the manufacturing cost.

(2) The Defric coating excellent in lubricating property and abrasion resistance property is adopted for the surface treatment for enhancing the solid lubricating property. Therefore, it is possible to reliably obtain the effect of suppressing the wide fluctuation in the frictional force between: the center washer 70 or the first end washer 71 and the second end washer 72; and the first side gear 4 and the second side gear 5, at the time of the relative rotation of the first side gear 4 and the second side gear 5.

(3) The friction coefficient at the sliding surface is decreased by providing the Defric coating, as shown in FIG. 4. Thus, the seizure, and the like at the first end washer 71 and the second end washer 72 are suppressed.

(4) The friction coefficient between: the center washer 70, the first end washer 71 and the second end washer 72; and the first side gear 4 and the second side gear 5 can be adjusted by changing the compounding ratio of the molybdenum disulfide, the graphite, and the like contained in the Defric coating. Thus, the TBR (torque bias ratio) of the pair of axle shafts can be adjusted without changing the helix angle of the gear portions 41, 51 of the first side gear 4 and the second side gear 5, and the gear portions 311, 312, 321, 322 of the first pinion gear 31 and the second pinion gear 32, for example, and a differential limiting performance adapted for the vehicle model and the application can be realized.

(5) The Vickers hardness of the first and second sliding surfaces 70a, 70b of the center washer 70 and the sliding surfaces 71a, 72a of the first end washer 71 and the second end washer 72 is lower than the Vickers hardness of the axial end faces 40a, 40b of the first side gear 4 and the axial end faces 50a, 50b of the second side gear 5. Therefore, aggressiveness to mating parts (tendency to abrade mating parts) of the center washer 70, the first end washer 71 and the second end washer 72 with respect to the first side gear 4 and the second side gear 5 can be reduced. The abrasion of the first side gear 4 and the second side gear 5 is thereby suppressed, and furthermore, the axial rattling of the first side gear 4 and the second side gear 5 in the differential case 2, the mixing of abrasion powder into the lubricating oil, and the like can be suppressed.

The present invention has been described based on the embodiment, but the present invention can be appropriately modified without departing from the scope of the present invention. The present invention may be modified as below, for example.

In the embodiment described above, a case of applying the present invention to the differential gear that distributes the driving force to right and left wheels of the vehicle has been described. However, the present invention is not limited to this. The present invention may be applied to a center differential that distributes the driving force of the drive source to the front wheel side and the rear wheel side of the four-wheel drive vehicle.

In the embodiment described above, a case of performing the Defric coating on the center washer 70, the first end washer 71 and the second end washer 72 has been described. However, the Defric coating may be provided only on the center washer 70 or on the first end washer 71 and the second end washer 72.

Moreover, in the embodiment described above, a case of adopting the Defric coating as the surface treatment for enhancing the solid lubricating property has been described. However, the surface treatment other than the Defric coating may be adopted as long as the effect of enhancing the solid lubricating property is obtained.

What is claimed is:

1. A vehicle differential gear that distributes a driving force of a drive source of a vehicle to a pair of output shafts while allowing a differential operation, the vehicle differential gear comprising:
   a differential case, to which the driving force is input;
   a plurality of pinion gears rotatably supported by the differential case;
   a pair of side gears meshing with the plurality of pinion gears and each coupled to a corresponding one of the pair of output shafts;
   a washer having a sliding surface that slides with an axial end face of at least one side gear of the pair of side gears to create a frictional force, the sliding at the sliding surface being lubricated by a lubricating oil; and
   a solid lubricant coating on the sliding surface to suppress a fluctuation of the frictional force, wherein
   the pair of side gears and the plurality of pinion gears are helical gears that generate a thrust force in an axial direction by meshing.

2. The vehicle differential gear according to claim 1, wherein the washer is arranged between the pair of side gears.

3. The vehicle differential gear according to claim 1, wherein the washer is arranged between the side gear and an inner surface of the differential case.

4. The vehicle differential gear according to claim 1, wherein the solid lubricant coating contains molybdenum disulfide and graphite.

5. The vehicle differential gear according to claim 1, wherein a Vickers hardness of the sliding surface of the washer is lower than a Vickers hardness of the axial end face of the side gear.

* * * * *